United States Patent
Yamamoto

(10) Patent No.: US 7,030,939 B2
(45) Date of Patent: Apr. 18, 2006

(54) TELEVISION TUNER UNIT WITH REDUCED AREA FOR MOUNTING ON MOTHER BOARD

(75) Inventor: Masaki Yamamoto, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 536 days.

(21) Appl. No.: 10/322,296

(22) Filed: Dec. 17, 2002

(65) Prior Publication Data

US 2003/0112381 A1  Jun. 19, 2003

(30) Foreign Application Priority Data

Dec. 19, 2001  (JP)  ............................... 2001-385699
Oct. 9, 2002  (JP)  ............................... 2002-006407

(51) Int. Cl.
*H04N 5/50*  (2006.01)
*H04N 5/44*  (2006.01)

(52) U.S. Cl. ...................... 348/731; 348/726; 348/738; 348/836

(58) Field of Classification Search ................ 348/731, 348/732, 733, 725, 726, 727, 728, 730, 738, 348/736, 836, 839, 818, 819, 820; 455/300, 455/301, 190.1, 191.1, 192.3; 334/64, 85; H04N 5/44, H04N 5/50, 5/64

See application file for complete search history.

(56) References Cited

U.S. PATENT DOCUMENTS

| 4,048,654 | A |   | 9/1977 | Wegner |
| 4,689,825 | A |   | 8/1987 | Geiger et al. |
| 5,355,532 | A | * | 10/1994 | Kubo et al. .................. 455/301 |
| 5,475,876 | A | * | 12/1995 | Terada et al. ................ 455/301 |

FOREIGN PATENT DOCUMENTS

| EP | 0 909 019 A2 | 4/1999 |
| EP | 0 909 019 A3 | 12/1999 |
| JP | HEI 06-334554 | 12/1994 |
| JP | 10290055 | 10/1998 |

* cited by examiner

*Primary Examiner*—Sherrie Hsia
(74) *Attorney, Agent, or Firm*—Brinks Hofer Gilson & Lione

(57) ABSTRACT

A metal frame is provided with plural terminals that are respectively connected to a tuner, a video intermediate frequency circuit part, and a stereo demodulator. The frame is preferably divided bilaterally into two regions, with the tuner in a first region and the video intermediate frequency circuit part and the stereo demodulator in a second region. The various components are preferably connected in series, with a U-shaped geometrical layout on the metal frame.

15 Claims, 2 Drawing Sheets

TELEVISION TUNER UNIT WITH REDUCED AREA FOR MOUNTING ON MOTHER BOARD

BACKGROUND OF THE INVENTION

1. Field of the Invention

The present invention relates to a television tuner unit having: a tuner for frequency-converting a received television signal into an intermediate frequency signal; a video intermediate frequency circuit part for detecting the intermediate frequency signal and outputting a video signal and a sound signal; and a stereo demodulator for demodulating a composite signal outputted from the video intermediate frequency circuit part and outputting a stereo sound signal.

2. Description of the Prior Art

FIG. 2 is a plan view showing a circuit layout of a conventional television tuner unit (hereinafter simply referred to as a tuner unit). A rectangular metal frame 11 has opposite long sides, a first side 11a and a second side 11b, and opposite short sides, a third side 11c and a fourth side 11d. A connector 12 through which television signals are inputted is attached to the third side 11c. The metal frame 11 is partitioned to first to third regions 11e, 11f, and 11g in this order from the third side 11c toward the fourth side 11d. In the regions 11e, 11f, and 11g, wiring boards (not shown) for forming circuits are respectively mounted.

In the first region 11e, a tuner 13 is formed which frequency-converts a received television signal into an intermediate frequency signal. The tuner 13 has an antenna tuning circuit 13a, a high-frequency amplifier circuit 13b, an interstage tuning circuit 13c, a composite IC (integrated circuit) 13d, a resonance circuit 13e, and an intermediate frequency tuning circuit 13f, and the like. The high-frequency amplifier circuit 13b is configured with a variable gain amplifier, and the composite IC 13d is configured with a mixer transistor, an oscillator transistor, a PLL circuit for selecting channels, and the like (not shown). The resonance circuit 13e is coupled to the oscillator transistor within the composite IC 13d to make up an oscillator.

In the second region 11f, a video intermediate frequency circuit part 14 is formed which detects an intermediate frequency signal and outputs a composite signal of a video signal, a sound signal, and stereo, and generates an AGC voltage. The video intermediate frequency circuit part 14 has a SAW filter 14a, a video intermediate frequency IC 14b including a video detector and an intermediate frequency amplifier (not shown), a voltage controlled oscillator 14c, a trap circuit 14d, and the like. The voltage controlled oscillator 14c is used to detect video.

In the third region 11g, a stereo demodulator 15 is formed which outputs a stereo sound signal from a composite signal outputted from the video intermediate frequency circuit part 14. A major portion of the stereo demodulator 15 is configured with integrated circuits.

The first side 11a is provided with plural terminals 16 that are respectively connected to the tuner 13, the video intermediate frequency circuit part 14, and the stereo demodulator 15. When the tuner unit is mounted on a mother board (not shown) on which television set main circuits are formed, the terminals 16 are inserted in the mother board and connected to the circuits.

The first side 11a corresponding to the first region 11e is provided with terminals related to the operation of the tuner 13 such as an AGC voltage input terminal (AGC) 16a, a PLL circuit address terminal (AS) 16b, a clock terminal (CL) 16c, a data terminal (D) 16d, a power terminal (B) 16e, a tuning voltage source terminal (TU) 16f, and the like.

The AGC terminal 16a is connected to the high-frequency amplifier circuit 13b; the address terminal 16b, clock terminal 16c, and data terminal 16d are connected to the composite IC 13d; the power terminal 16e is connected to the high-frequency amplifier circuit 13b and the composite IC 13d; and the tuning voltage source terminal 16f is connected to the composite IC 13d.

The first side 11a corresponding to the second region 11f is provided with terminals related to the operation of the video intermediate frequency circuit part 14 such as a power terminal (B) 16g, an AGC voltage output terminal (AGC) 16h, a video signal terminal (V) 16i, a sound signal terminal (A) 16j, and the like. The power terminal 16g and the AGC voltage output terminal 16h are connected to the video intermediate frequency IC 14b, and the video signal terminal 16i and the sound signal terminal 16j are connected to the trap circuit 14d.

The first side 11a corresponding to the third, region 11g is provided with a power terminal (B) 16k, a right sound signal terminal (R) 16l, and a left sound signal terminal (L) 16m that are connected to the stereo demodulator 15.

From a power supply part of the television set body, a power supply voltage is applied to the three power terminals 16e, 16g, and 16k through which it is supplied to corresponding circuits. This prevents a power supply line within the tuner unit from becoming long. Also to the tuning voltage source terminal 16f, a voltage (30 V) is supplied from the power supply part of the television set body. This voltage serves as a voltage source for generating a tuning voltage for selecting a channel, and the tuning voltage is set based on a signal related to channel selection, inputted to the address terminal 16b, clock terminal 16c, and data terminal 16d. The set tuning voltage is supplied to the antenna tuning circuit 13a and the interstage tuning circuit 13c.

A video signal and a sound signal of a selected channel are outputted to the video signal terminal 16i and the sound signal terminal 16j, respectively. For stereo broadcasting, a stereo sound signal is outputted to the right sound signal terminal (R) 16l and the left sound signal terminal (L) 16m. An AGC voltage outputted to the AGC voltage output terminal 16h is inputted to the AGC voltage input terminal 16a again via the mother board and supplied to the high-frequency amplifier circuit 13b.

With the structure of conventional tuner units, circuits (tuner, video intermediate frequency circuit part, and stereo demodulator) are disposed in the horizontally extending region, the first region to third region, increasing a mounting area on a mother board of the television set body. Also, the three power terminals are provided because of the long disposition of the circuits, increasing the number of terminals. Moreover, the two AGC terminals are provided to supply an AGC voltage generated in the video intermediate frequency circuit part to the high-frequency amplifier, increasing the number of terminals.

SUMMARY OF THE INVENTION

This disclosure teaches the construction of a television tuner unit that requires reduced mounting area on a mother board of a television set body and fewer terminals for connecting with the mother board.

In one embodiment, the television tuner unit includes: a tuner for frequency-converting a received television signal into an intermediate frequency signal; a video intermediate frequency circuit part for detecting the intermediate frequency signal and outputting a video signal and a sound signal; a stereo demodulator for demodulating a composite signal outputted from the video intermediate frequency circuit part and outputting a stereo sound signal; and a metal frame having four sides and storing the tuner, the video intermediate frequency circuit part, and the stereo demodulator therein. The components of the television tuner unit are preferably arranged in a geometric layout that that allows sequential processing elements on the metal frame to form a U-shaped signal path.

In a preferred embodiment of the television tuner unit, a first side of the metal frame is provided with plural terminals that are respectively connected to the tuner, the video intermediate frequency circuit part, and the stereo demodulator. The tuner is disposed in a first of two partitioned regions of the metal frame; a connector for inputting the television signal is attached to the first partitioned region. The stereo demodulator and the video intermediate frequency circuit part are disposed in the second partitioned region. The stereo demodulator is disposed in a first region of the second partitioned region, and the video intermediate frequency circuit part is disposed in a second region of the second partitioned region.

One of the plural-terminals is a power terminal through which a power supply voltage is supplied from the outside, and the power supply voltage is supplied from the power terminal to the tuner, the video intermediate frequency circuit part, and the stereo demodulator.

The video intermediate frequency circuit part outputs an AGC voltage, the tuner is provided with a variable gain amplifier, and the AGC voltage is inputted to the variable gain amplifier within the metal frame.

Of the plural terminals, a stereo sound terminal for outputting the stereo sound signal is provided in the first region, and a video terminal for outputting the video signal and a sound terminal for outputting the sound signal are provided in the second region.

BRIEF DESCRIPTION OF THE DRAWINGS

Preferred embodiments of the present invention will be described in detail based on the followings, wherein.

DESCRIPTION OF THE PREFERRED EMBODIMENTS

Figure 1:
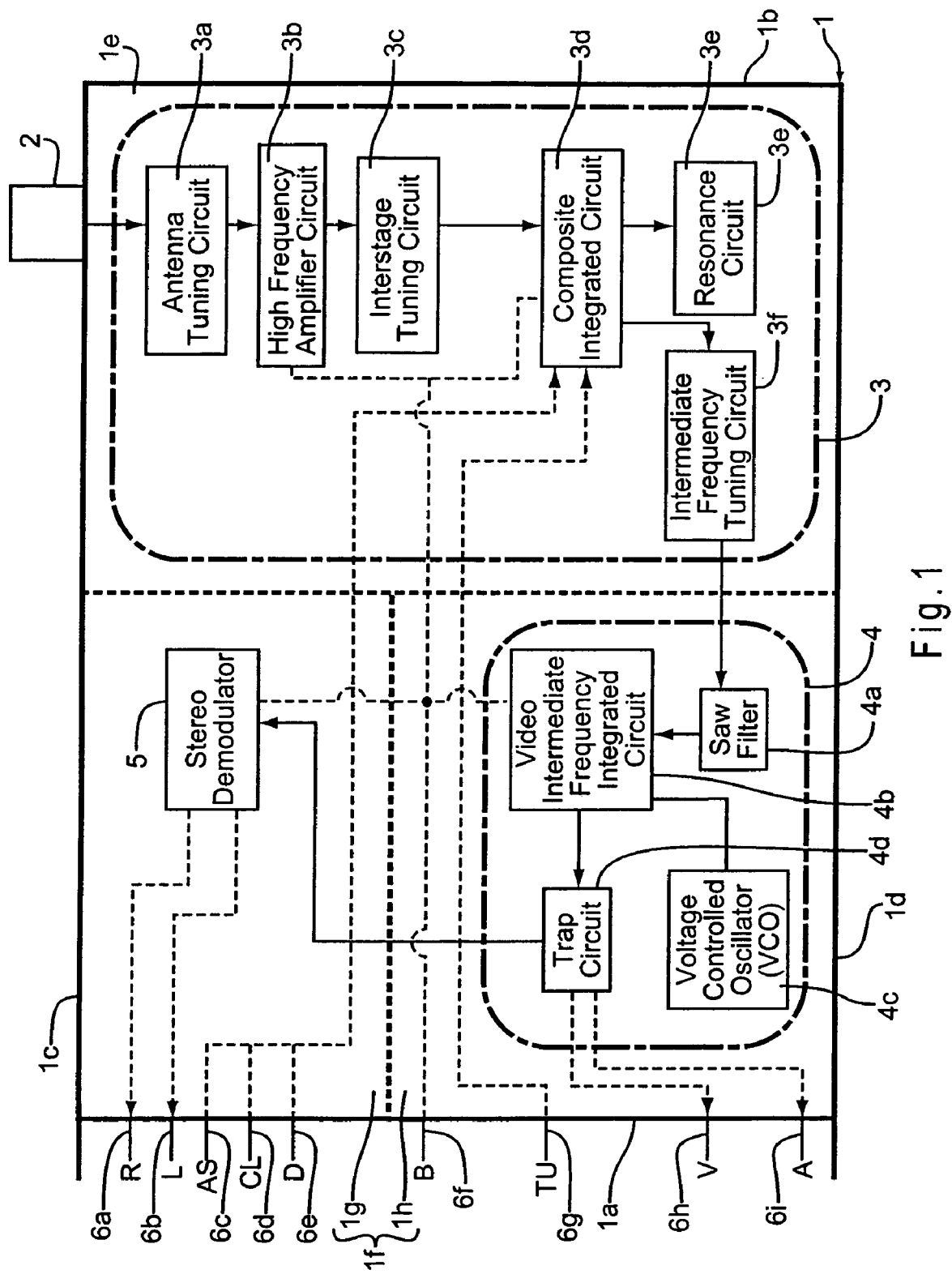
FIG. 1 is a plan view showing a circuit layout of the television tuner unit of the present invention.
Figure 2:
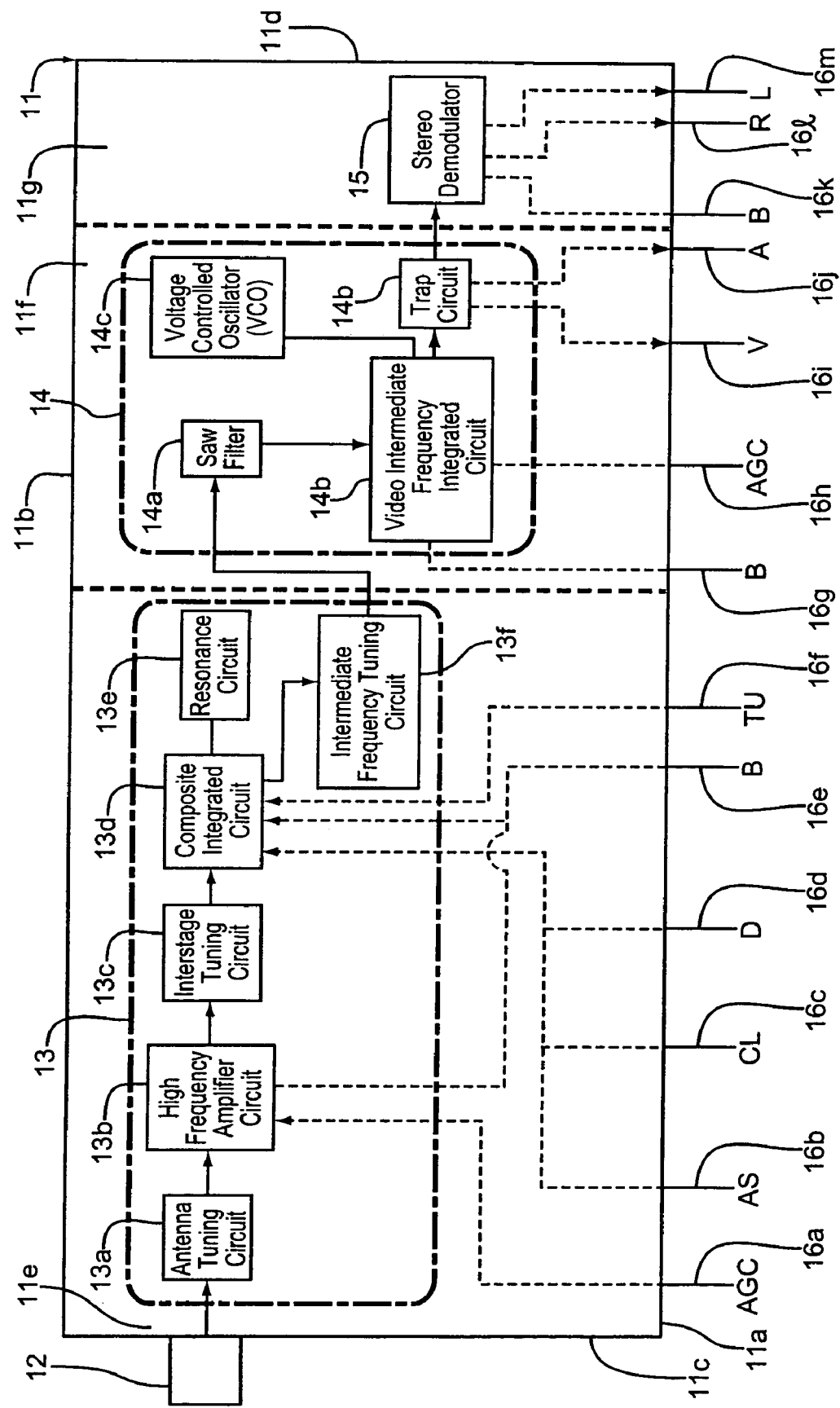
FIG. 2 is a plan view showing a circuit layout of a conventional television tuner unit.

FIG. 1 is a plan view showing a circuit layout of one version of a television tuner unit, hereinafter simply referred to as a tuner unit. A rectangular metal frame 1 has one pair of opposite sides, a first side 1a and a second side 1b, and another pair of opposite sides, a third side 1c and a fourth side 1d. A connector 2 through which television signals are inputted is attached at the third side 1c. A wiring board (not shown) for forming circuits is stored within the metal frame 1. The inside of the metal frame 1 is halved to a first partitioned region 1e at the second side 1b and a second partitioned region 1f at the first side 1a opposite to the second side 1b, and the second partitioned region 1f is halved to a first region 1g at the third side 1c and a second region 1h at the fourth side 1d.

A tuner 3 for frequency-converting a received television signal into an intermediate signal is formed on a wiring board in the first partitioned region 1e. The tuner 3 has an antenna tuning circuit 3a, a high-frequency amplifier circuit 3b, an interstage tuning circuit 3c, a composite IC (integrated circuit) 3d, a resonance circuit 3e, and an intermediate frequency tuning circuit 3f, and the like. The high-frequency amplifier circuit 3b is configured with a variable gain amplifier, and the composite IC 3d is configured with a mixer transistor, an oscillator transistor, a PLL circuit for selecting channels, and the like. The resonance circuit 3e is coupled to the oscillator transistor within the composite IC 3d to make up an oscillator.

In the second region 1h in the second partitioned region 1f, a video intermediate frequency circuit part 4 is formed which detects an intermediate frequency signal and outputs a composite signal of a video signal, a sound signal, and stereo, and generates an AGC voltage. The video intermediate frequency circuit part 4 has a SAW filter 4a, a video intermediate frequency IC 4b including a video detector and an intermediate frequency amplifier (not shown), a voltage controlled oscillator 4c, a trap circuit 4d, and the like. The voltage controlled oscillator 4c is coupled to a video detector within the video intermediate frequency circuit part 4.

In the first region 1g in the second partitioned region 1f, a stereo demodulator 5 is formed which outputs a stereo sound signal from a composite signal outputted from the video intermediate frequency circuit part 4. The major portion of the stereo demodulator 5 is configured with integrated circuits.

The first side 1a is provided with plural terminals 6 that are respectively connected to the tuner 3, the video intermediate frequency circuit part 4, and the stereo demodulator 5. When the tuner unit is mounted on. a mother board (not shown) on which television set main circuits are formed, the terminals 6 are inserted in the mother board and connected to the circuits on the mother board.

The first side 1a corresponding to the first region 1g is provided with a right sound signal terminal (R) 6a and a left sound signal terminal (L) 6b that are connected to the stereo demodulator 5, and an address terminal (AS) 6c for PLL circuits related to the operation of the tuner, a clock terminal (CL) 6d, a data terminal (D) 6e, and the like.

The first side 1a corresponding to the second area 1h is provided with a power terminal (B) 6f, a tuning voltage source terminal (TU) 6g related to the operation of the tuner 3, a video signal terminal (V) 6h related to the operation of the video intermediate frequency circuit part 4, a sound signal terminal (A) 6i, and the like. Of the above terminals, the power terminal 6f and the tuning voltage source terminal 6g may be provided at the first side 1a corresponding to the first region 1g.

The address terminal 6c, the clock terminal 6d, and the data terminal 6e are connected to the composite IC 3d, and the power terminal 6f is connected to the high-frequency amplifier circuit 3b, the composite IC 3d, the video intermediate frequency IC 4b, and the stereo demodulator 5. The tuning voltage source terminal 6g is connected to the composite IC 3d. The video signal terminal 6h and the sound signal terminal 6i are connected to the trap circuit 4d.

A cover (not shown) covering the partitioned regions 1e and 1f of the metal frame 1 is installed in the metal frame 1 and electromagnetically shielded.

From a power supply part of the television set body, a power supply voltage (5 V) is applied to the power terminal 6f through which it is supplied to the high-frequency amplifier circuit 3b, the composite IC 3d, the video intermediate frequency IC 4b, and the stereo demodulator 5. Also to the tuning voltage source terminal 6g, a voltage (30 V) is supplied from the power supply part of the television set body. This voltage serves as a voltage source for generating a tuning voltage for selecting a channel, and the tuning voltage is set based on a signal related to channel selection, inputted to the address terminal 6c, clock terminal 6d, and data terminal 6e. The set tuning voltage is supplied to the antenna tuning circuit 3a, the interstage tuning circuit 3c, the resonance circuit 3e, and the like.

In the above configuration, a television signal inputted from the connector 2 is frequency-converted into an intermediate signal by the tuner 3 disposed in the first partitioned region 1e, and the intermediate signal is processed by the video intermediate frequency circuit part 4 disposed in the second region 1h to output a video signal, a sound signal, a composite signal and an AGC voltage. The video signal and the sound signal are outputted to the video signal terminal 6h and the sound signal terminal 6i, respectively. The outputted AGC voltage is supplied to the high-frequency amplifier circuit 3b through a wiring board. For stereo broadcasting, the composite signal is demodulated by the stereo demodulator 5 disposed in the first region to output a stereo sound signal to the right sound signal terminal (R) 6a and the left sound signal terminal (L) 6b.

Since the first partitioned region 1e in which the tuner 3 is disposed faces the second partitioned region 1f—including the second region 1h in which the video intermediate frequency circuit part 4 is disposed, and the first region 1g in which the stereo demodulator 5 is disposed—signals processed in the circuit parts flow within the metal frame in the shape of the letter U as shown by the arrows in the drawing. In one implementation of the tuner unit, the circuit connections are designed to exploit this geometry so that little or no interference occurs among the circuit parts. Since the first side 1a at which the terminals 6 are provided is shortened for the reason described above, a mounting area on the mother board is reduced. Also, since the shortened first side 1a reduces distances between the circuit parts, one power terminal preferably suffices for the supply of a power supply voltage, and the AGC terminals can be omitted to reduce the number of terminals.

As has been described above, according to the present invention, the first side of the metal frame is provided with the plural terminals that are connected to the tuner, the video intermediate frequency circuit part, and the stereo demodulator. The tuner is disposed in the first partitioned region adjacent to the second side of the metal frame. The connector for inputting the television signal is attached to the first partitioned region on the third side of the metal frame. The stereo demodulator and the video intermediate frequency circuit part are disposed in the second partitioned region, near the first side of the metal frame. With this construction, the first side at which the terminals are provided is shortened, so that a mounting area on the mother board of the television set body is reduced.

The stereo demodulator is disposed in the first region adjacent to the third side in the second partitioned region and the video intermediate frequency circuit part is disposed in the second region adjacent to the fourth side in the second partitioned region. With this construction, signals processed in the circuit parts flow within the metal frame in the shape of the letter U.

One of the terminals is a power terminal to which a power supply voltage is supplied from the outside. From the power terminal, the power supply voltage is supplied to the video intermediate frequency circuit part and the stereo demodulator. With this construction, only one power terminal is preferably required, thereby reducing the total number of terminals.

The video intermediate frequency circuit part preferably outputs an AGC voltage, the tuner includes a variable gain amplifier, and the AGC voltage is inputted to the variable gain amplifier. With this construction, an AGC voltage terminal is not required, contributing to reduction in the number of terminals.

Of the plural terminals, a stereo sound terminal for outputting the stereo sound signal is provided at the first side of the metal frame in the first region, and a video terminal for outputting the video signal and a sound terminal for outputting the sound signal are provided at the first side of the metal frame in the second region. With this construction, the stereo sound signal, video signal, and sound signal can be outputted with a minimum distance between their output terminals.

What is claimed is:

1. A television tuner unit comprising:
   a tuner for frequency-converting a received television signal into an intermediate frequency signal;
   a video intermediate frequency circuit part for detecting the intermediate frequency signal and outputting a video signal and a sound signal;
   a stereo demodulator for demodulating a composite signal outputted from the video intermediate frequency circuit part and outputting a stereo sound signal; and
   a metal frame having four sides, including a first side, a second side, and a third side, the metal frame storing the tuner, the video intermediate frequency circuit part, and the stereo demodulator therein,
   a plurality of terminals on the first side of the metal frame, connected to the tuner, the video intermediate frequency circuit part, and the stereo demodulator,
   wherein the tuner is disposed in a first partitioned region proximate to the second side of the metal frame; and
   wherein the stereo demodulator and the video intermediate frequency circuit part are disposed in a second partitioned region proximate to the first side of the metal frame;
   wherein the first and second partitioned regions divide the inside of the metal frame.

2. The television tuner unit according to claim 1, wherein the stereo demodulator is disposed in a first subregion in the second partitioned region, and wherein the video intermediate frequency circuit part is disposed in a second subregion in the second partitioned region.

3. The television tuner unit according to claim 1, wherein one of the plurality of terminals is a power terminal through which a power supply voltage is supplied from the outside, and wherein the power supply voltage is supplied from the power terminal to the tuner, the video intermediate frequency circuit part, and the stereo demodulator.

4. The television tuner unit according to claim 1, wherein the video intermediate frequency circuit part outputs an AGC voltage, wherein the tuner is provided with a variable gain amplifier, and wherein the AGC voltage is inputted to the variable gain amplifier within the metal frame.

5. The television tuner unit according to claim 2, wherein, of the plurality of terminals,
   a stereo sound terminal for outputting the stereo sound signal is provided in the first subregion, and
   a video terminal for outputting the video signal and a sound terminal for outputting the sound signal are provided in the second subregion.

6. The television tuner unit according to claim 1, wherein a connector for inputting the television signal is attached in a position proximate to the first partitioned region, on the third side of the metal frame, adjacent to the first side and the second side of the metal frame.

7. A television tuner circuit comprising:
a circuit board; and
a plurality of components mounted on the circuit board;
wherein the plurality of components includes:
a) a tuner circuit,
b) a video intermediate-frequency circuit, and
c) a demodulator circuit;
wherein the components in the plurality of components are electronically coupled in series, thereby forming a primary signal path through the components in the plurality of components;
wherein the components in the plurality of components are mechanically mounted so that the primary signal path follows a substantially U-shaped path.

8. The television tuner circuit of claim 7, wherein:
the circuit board includes a first component area, a second component area, and a third component area, wherein the first, second, and third component areas are nonoverlapping;
the tuner circuit is disposed in the first component area, adjacent to a first edge of the circuit board;
the video intermediate-frequency circuit is disposed in the second component area, adjacent to a second edge of the circuit board opposite the first edge of the circuit board, and electronically coupled to the tuner circuit; and
the demodulator circuit is disposed in the third component area, adjacent to the second edge of the circuit board, and electronically coupled to the video intermediate-frequency circuit.

9. The television tuner circuit of claim 7, wherein the demodulator circuit includes a stereo demodulation circuit.

10. The television tuner circuit of claim 7, further comprising:
a variable gain amplifier disposed in the tuner circuit; and
an on-board connection configured to provide an AGC signal from the video intermediate-frequency circuit to the variable gain amplifier.

11. The television tuner circuit of claim 7, further comprising:
a power connector disposed on the circuit board, coupled to the tuner circuit, to the video intermediate-frequency circuit, and to the demodulator circuit;
wherein the power connector is configured to provide power to the tuner circuit, to the video intermediate-frequency circuit, and to the demodulator circuit.

12. The television tuner circuit of claim 7, wherein:
the circuit board includes a first region and a second region, wherein the first and second regions are geometrically nonoverlapping;
the tuner circuit is disposed in the first region;
the video intermediate-frequency circuit is disposed in the second region; and the demodulator circuit is disposed in the second region.

13. The television tuner circuit of claim 12, wherein:
the second region includes a first subregion and a second subregion, wherein the first and second subregions are geometrically nonoverlapping;
the demodulator circuit is disposed in the first subregion, and
the video intermediate-frequency circuit is disposed in the second subregion.

14. The television tuner circuit of claim 7, wherein the circuit board includes:
a mounting edge configured to electronically connect the television tuner circuit to the mother board;
wherein the mounting edge has a length substantially less than the sum of:
a) the end-to-end (input-to-output) length of the tuner circuit,
b) the end-to-end (input-to-output) length of the video intermediate-frequency circuit, and
c) the end-to-end (input-to-output) length of the demodulator circuit.

15. The television tuner circuit of claim 7, wherein the television tuner circuit is configured to receive a television signal and configured to generate the intermediate-frequency signal in response to the television signal.

* * * * *